Dec. 21, 1954

A. E. WOLTANSKI 2,697,795

DYNAMOELECTRIC MACHINE

Filed Jan. 24, 1950

INVENTOR.
ADOLPH E. WOLTANSKI
BY
Martin J. Finnegan
Attorney

Dec. 21, 1954 A. E. WOLTANSKI 2,697,795
DYNAMOELECTRIC MACHINE
Filed Jan. 24, 1950 3 Sheets-Sheet 2

INVENTOR
ADOLPH E. WOLTANSKI
BY
Martin J. Finnegan
ATTORNEY

Dec. 21, 1954     A. E. WOLTANSKI     2,697,795
DYNAMOELECTRIC MACHINE

Filed Jan. 24, 1950     3 Sheets-Sheet 3

INVENTOR.
ADOLPH E. WOLTANSKI
BY Martin J. Finnegan
ATTORNEY

2,697,795
Patented Dec. 21, 1954

2,697,795

DYNAMOELECTRIC MACHINE

Adolph E. Woltanski, Henderson, Mich., assignor to Redmond Company, Inc., Owosso, Mich., a corporation of Michigan Application January 24, 1950, Serial No. 140,319

10 Claims. (Cl. 310—258)

This invention relates to dynamo-electric machines, and particularly to electric motors for such duty as the actuation of a rotating or oscillating blade assembly of the class commonly employed in automatic shaving appliances.

An object of the invention is to provide a machine in which the non-rotating portions of the machine—that is, the stator, or field structure, and associated parts such as the brush supports—are of novel construction having decided advantages in respect to simplicity of composition and conservation of space laterally of the axis of rotation of the machine.

A second object is to provide a machine in which the stator has only three major components, namely, a central field frame and two end castings, the latter serving as supports for (1) the two end bearing assemblies, (2) the two brush assemblies, and (3) the central field frame, including the field coils wound thereon.

A third object of the invention is to provide, in a three-component stator of the character indicated, a central field frame of novel laminated construction, in which each lamina is provided with diametrically opposed recesses adapted for longitudinal alignment with screw-receiving holes formed in the end castings, whereby the laminated field frame is held to the two end castings by a pair of long screws passing therethrough; the screw-receiving recesses of the laminae being co-extensive with the arcs connecting the two field coil-receiving polar projections on said laminae, and there being no retaining screws or bolts passing through the coil-receiving portions of said laminae. By this novel arrangement I effect a marked saving in the over-all transverse dimensions of the laminated field frame, as well as a simplification of the general composition of the motor.

A fourth object of the invention is the provision of end castings of novel construction and inter-relationship to the field frame, resulting in a still further simplification of the motor composition; a feature of the novel construction being the concentration of the brush mountings and the screw supports within an arcuate dimension of less than ninety degrees, on either side of a central transverse plane. This concentration of supports combines with the above-described novel field frame arrangement to produce a motor having decided oblateness along two diametrically opposed quadrants, which oblateness presents a quasi-elliptical effect, in transverse section, lending itself to convenient use of the motor as the power unit of an electric shaving instrument.

These and other objects of the invention will be better understood upon reference to the accompanying drawings illustrating one embodiment of the invention; the illustrated embodiment being described in detail hereinafter. It is to be understood, of course, that other embodiments differing as to details but identical in principles are possible, and are embraced herein to the extent that such principles are novel in the art.

In the drawings:

Fig. 1 is a cross sectional view on an enlarged scale of the electric motor of the present invention taken along a line corresponding to 1—1 in Fig. 2;

Figs. 2 and 3 are transverse sectional views along lines 2—2, and 3—3, respectively, of Fig. 1;

Figure 1:
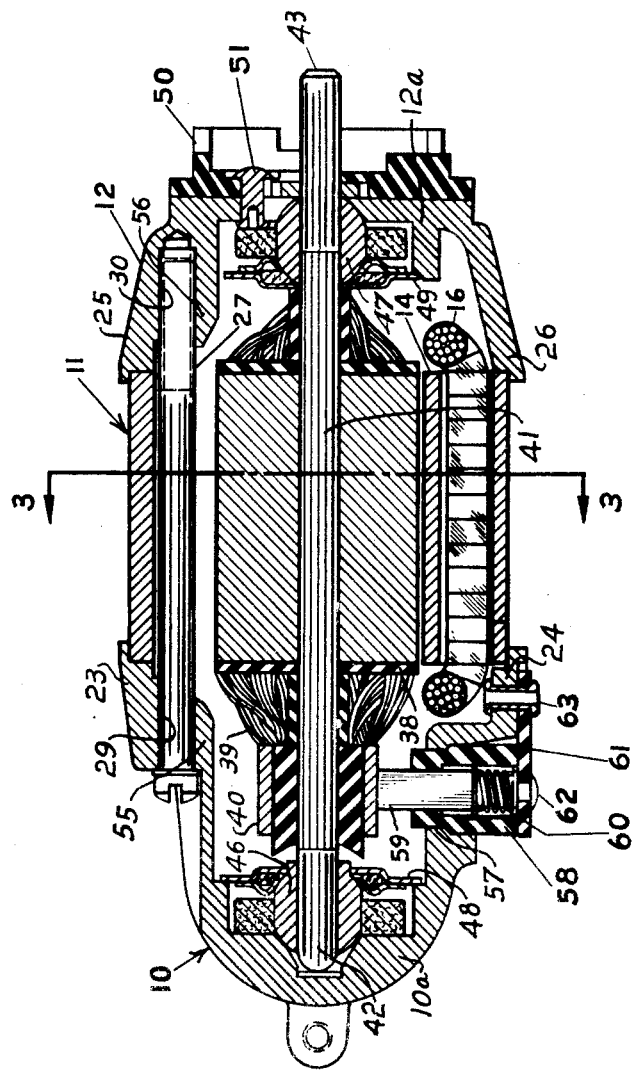
Figure 2:
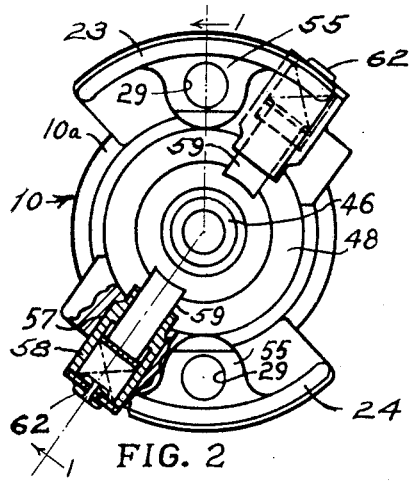
Figure 7:
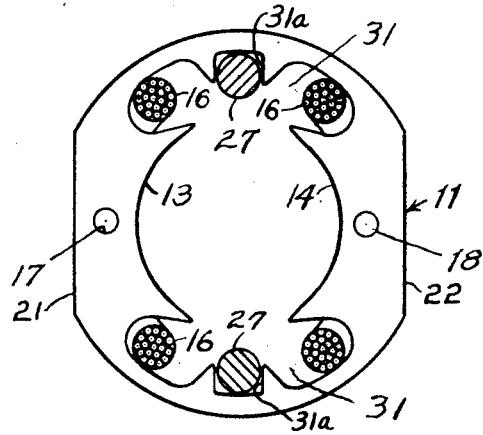
Fig. 7 is a view of one field lamination.
Figure 3:
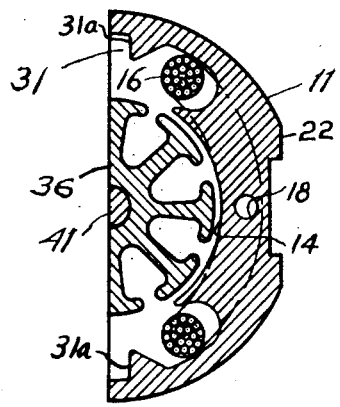
Figure 4:
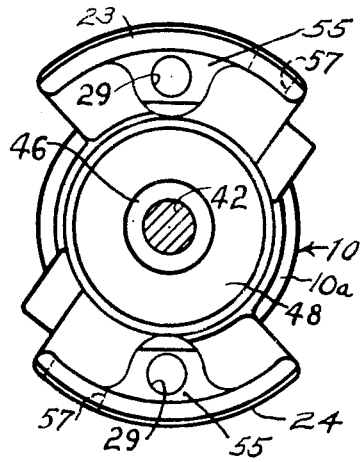
Fig. 4 is a view in elevation of one end casting.
Figure 6:
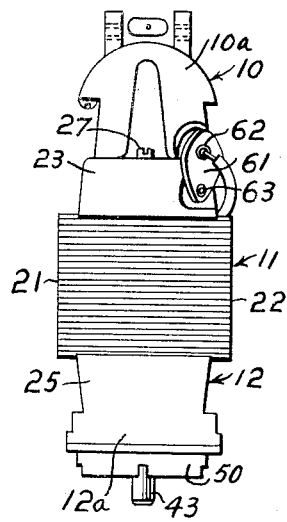
Fig. 6 is a view in elevation of the complete motor, on a scale corresponding approximately to actual size.

Referring to these views, the central field frame is indicated at 11, and the two end housings at 10 and 12; the field frame being made up of stacked laminae, each of the shape indicated in Fig. 7. As there shown, each lamina has a pair of diametrically opposed polar projections 13, 14, each adapted to be embraced by a pre-formed current receiving coil corresponding to the coil indicated at 16 in Fig. 1. At spaced points along the intervening recessed sections of the field laminae holes 17, 18 are punched, so that when the laminae are stacked these holes 17, 18 may be aligned in position to receive the usual assembly rivets.

Figure 8:
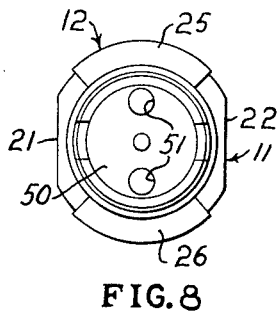
Fig. 8 is an end view of the motor on the scale of Fig. 6.
Figure 5:
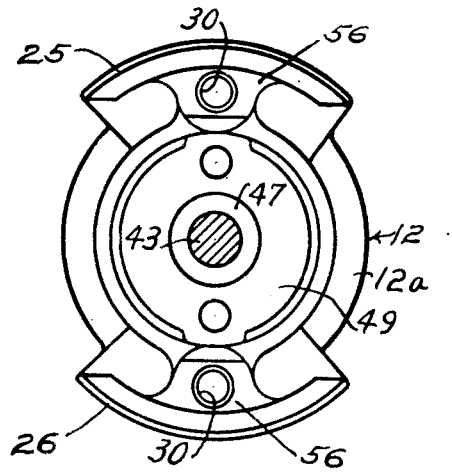
Fig. 5 is a view in elevation of the opposite end casting.

It will be observed that each lamina has truncated sections 21, 22 opposite the polar projections 13, 14, respectively, and that the arcuate outer rims 23—24 and 25—26 of the end housings 10 and 12, respectively, which rims extend longitudinally for an appreciable distance from the central portions 10a and 12a of the end housings 10 and 12 respectively, are correspondingly truncated, spaces being defined between the adjacent rim side edges on each side of the housings 10 and 12, so that upon assembly of the three major parts 10, 11 and 12, by insertion of long screws 27 into the aligned holes 29, 30 of the two end castings—the said screws 27 passing mid-way of the recessed sections 31 of the stacked laminae and through apertures 31a formed therein, the ends of the rims 23—26 then engaging the central field frame 11—the complete motor has an oblate, or quasi-elliptical, transverse shape, as indicated in Fig. 8.

The rotor is illustrated as including a central armature portion 36 enclosed in end discs 37, 38 of insulating material, suitably slotted to permit passage of the armature windings 39 which terminate at the commutator 40 in the usual manner. The commutator and armature are integrated with central shaft 41 by the conventional method of knurling the shaft prior to force-fitting it into the armature assembly. The ends 42, 43 of the shaft 41 are passed into bearing assemblies 46, 47, respectively, held in position in the central portions 10a and 12a respectively of the end housings 10 and 12 by retainer plates 48, 49. A shaver head receiving plate 50 is secured to the outer flat face of end casting 12 by suitable rivets 51.

As previously noted, the long screws 27 pass through aligned holes in the end housings 10 and 12, each of which has suitable bosses 55, 56 to provide added bearing surface to support the screws; the holes in the housing 12 being threaded to grip the corresponding threads on the end portions of the screws. Housing 10 has additional openings 57 to receive brush holding bushings 58 of non-conducting material, through which bushings pass the brushes 59 and the pressure-applying springs 60, held in place by retainer plates 61, and rivets 62, 63.

The concentration of the brush supports 58 into close proximity to the screw-receiving bosses 55, 56 is an important factor in obtaining the desired oblate effect, transversely, as indicated in Fig. 8, for this concentration of supports makes possible the truncating of the arcuate rims of the end castings, to conform to the similar truncating of the field frame laminae, as illustrated at 21 and 22 in Fig. 7. Moreover, by reason of the fact that the central portions 10a and 12a of the end housings 10 and 12 respectively are axially spaced from the central field frame 11 by distances corresponding to the lengths of the truncated rims 23—26, and because those rims are truncated, thus defining spaces between their adjacent edges on each side of the housing, the interior of the motor on either end of the central field frame 11 is exposed. This greatly facilitates ventilation of the motor when in use and hence tends to increase its life. In addition, it renders the commutator 40 and brushes 59 readily visible and accessible, and also permits free access to the bearings 46 and 47, all without requiring disassembly of the motor itself.

What I claim is:

1. In a dynamo-electric machine, a centrally disposed armature shaft, a field frame having parallel sides spaced apart by a distance substantially less than the major diametral dimension of said field frame, and shaft supporting housing elements disposed at either end of said field frame, one of said housing elements having an outer arcuate surface whose extent from side to side is substantially equal to the distance between the parallel sides of said field frame, said arcuate surface being radially apertured adjacent one side thereof, and a current conducting brush assembly insertable radially into said housing element through said apertured portion of said housing element.

2. The dynamo-electric machine of claim 1, in which said one of said housing elements has an aperture parallel to said shaft and substantially centrally of said arcuate surface, said field frame and said other housing element having aligned apertures, and an elongated securing member passing through said apertures and operatively connected to said housing elements so as to secure them together and to said field frame.

3. In a dynamo-electric machine, a laminated field frame comprising a pair of opposed spaced polar projections, and housings disposed at either end of said field frame, each of said housings comprising a central portion adapted to hold a bearing for an armature shaft and substantially diametrically opposed, longitudinally projecting arcuate rims having an arcuate extent of less than 180 degrees each, spaces being defined between adjacent sides of said rims, the end edges of said rims engaging the ends of said field frame and the central portions of said housings being axially spaced from said field frame, the interior of the thus defined structure being exposed at the spaces from the adjacent sides of said rims, and securing means operatively connected to said housings for retaining them in position.

4. The dynamo-electric machine of claim 3, in which said field frame is composed of laminae truncated to form straight chordal sides in registration with said polar projections, said housing rims extending from side to side in substantial registration with the non-truncated sides of said field frame, the spaces between adjacent sides of said rims thereby being substantially of the same length as and in registration with said chordal sides of said field frame.

5. The dynamo-electric machine of claim 4, in which said rims have apertures substantially parallel to the axis of the thus defined structure and substantially centrally circumferentially located with respect to said rims, said field frame having aligned apertures, the apertures in said rims and said field frame thereby defining two sets of aligned, diametrically opposed apertures, and elongated securing members passing through each of said sets of apertures and operatively connected to said housings so as to secure them together and to said field frame.

6. The dynamo-electric machine of claim 4, in which the rims of one of said housings are provided with substantially radial and diametrically opposed apertures adjacent side edges thereof, a current-conducting brush assembly being received in each of said radial apertures and extending inwardly therefrom.

7. The dynamo-electric machine of claim 4, in which said rims have apertures substantially parallel to the axis of the thus defined structure and substantially centrally circumferentially located with respect to said rims, said field frame having aligned apertures, the apertures in said rims and said field frame thereby defining two sets of aligned, diametrically opposed apertures, and elongated securing members passing through each of said sets of apertures and operatively connected to said housings so as to secure them together and to said field frame, and in which the rims of one of said housings are provided with substantially radial and diametrically opposed apertures adjacent side edges thereof, a current-conducting brush assembly being received in each of said radial apertures and extending inwardly therefrom.

8. The dynamo-electric machine of claim 3, in which said rims have apertures substantially parallel to the axis of the thus defined structure and substantially centrally circumferentially located with respect to said rims, said field frame having aligned apertures, the apertures in said rims and said field frame thereby defining two sets of aligned, diametrically opposed apertures, and elongated securing members passing through each of said sets of apertures and operatively connected to said housings so as to secure them together and to said field frame.

9. The dynamo-electric machine of claim 3, in which the rims of one of said housings are provided with substantially radial and diametrically opposed apertures adjacent side edges thereof, a current-conducting brush assembly being received in each of said radial apertures and extending inwardly therefrom.

10. The dynamo-electric machine of claim 3, in which said rims have apertures substantially parallel to the axis of the thus defined structure and substantially centrally circumferentially located with respect to said rims, said field frame having aligned apertures, the apertures in said rims and said field frame thereby defining two sets of aligned, diametrically opposed apertures, and elongated securing members passing through each of said sets of apertures and operatively connected to said housings so as to secure them together and to said field frame, and in which the rims of one of said housings are provided with substantially radial and diametrically opposed apertures adjacent side edges thereof, a current-conducting brush assembly being received in each of said radial apertures and extending inwardly therefrom.

References Cited in the file of this patent

UNITED STATES PATENTS

| Number | Name | Date |
|---|---|---|
| 781,062 | Hauss et al. | Jan. 31, 1905 |
| 1,686,324 | Hillix | Oct. 2, 1928 |
| 1,822,859 | Perkins | Sept. 8, 1931 |
| 1,892,997 | Oldenburg | Jan. 3, 1933 |
| 2,136,301 | Hoddy et al. | Nov. 8, 1938 |
| 2,300,957 | Miner | Nov. 3, 1942 |
| 2,456,571 | Turner et al. | Dec. 14, 1948 |
| 2,478,551 | Turner | Aug. 9, 1949 |
| 2,499,928 | Misic | Mar. 7, 1950 |